US011187641B2

United States Patent
Montajir et al.

(10) Patent No.: US 11,187,641 B2
(45) Date of Patent: Nov. 30, 2021

(54) PARTICLE NUMBER COUNTING DEVICE AND PARTICLE NUMBER COUNTING METHOD

(71) Applicant: HORIBA, LTD., Kyoto (JP)

(72) Inventors: Rahman Montajir, Irvine, CA (US); Yoshinori Otsuki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 140 days.

(21) Appl. No.: 16/564,931

(22) Filed: Sep. 9, 2019

(65) Prior Publication Data
US 2020/0182767 A1    Jun. 11, 2020

(30) Foreign Application Priority Data

Dec. 10, 2018 (JP) .............................. JP2018-230563

(51) Int. Cl.
*G01N 15/06* (2006.01)
*G01M 15/10* (2006.01)
*G01N 15/00* (2006.01)

(52) U.S. Cl.
CPC ........ *G01N 15/065* (2013.01); *G01M 15/102* (2013.01); *G01M 15/106* (2013.01); *G01N 2015/0046* (2013.01)

(58) Field of Classification Search
CPC ........ G01N 15/065; G01N 2015/0046; G01M 15/106; G01M 15/102
See application file for complete search history.

(56) References Cited

U.S. PATENT DOCUMENTS

| 3,942,357 A * | 3/1976 | Jenkins ................... G01N 7/00 73/31.07 |
| 6,502,450 B1 | 1/2003 | Patashnick et al. |

(Continued)

FOREIGN PATENT DOCUMENTS

| JP | 2012-127773 A | 7/2012 |
| JP | 2012-154657 A | 8/2012 |

OTHER PUBLICATIONS

English translation of Okuda et al. JP 2012-154657 that was listed on the IDS filed Apr. 17, 2020 (Year: 2012).*

(Continued)

*Primary Examiner* — Herbert K Roberts
*Assistant Examiner* — John M Royston
(74) *Attorney, Agent, or Firm* — Brooks Kushman P.C.

(57) ABSTRACT

The present invention reduces the effects from variations in the outside air pressure on particle number counting, and is provided with an exhaust gas processing unit that performs predetermined processing on exhaust gas, a particle number counting unit that counts a number of particles contained in exhaust gas that has passed through the exhaust gas processing unit, a fluid resistance element that is provided downstream from the particle number counting unit, a suction pump that is provided downstream from the fluid resistance element, a gas supply path that is connected to a flow path between the fluid resistance element and the suction pump, and supplies gas to a downstream side of the fluid resistance element, and a flow rate adjustment unit that is provided on the gas supply path, and adjusts a flow rate of the gas that is supplied to the downstream side of the fluid resistance element.

5 Claims, 3 Drawing Sheets

(56) References Cited

U.S. PATENT DOCUMENTS

2011/0192145 A1* 8/2011 Hanada .................. G01N 15/06
60/276
2014/0331752 A1* 11/2014 Hall .................... G01M 15/102
73/114.75

OTHER PUBLICATIONS

Partial European Search Report dated Mar. 16, 2020 issued for European patent application No. 19 194 212.7, 14 pgs.

* cited by examiner

PARTICLE NUMBER COUNTING DEVICE AND PARTICLE NUMBER COUNTING METHOD

CROSS-REFERENCE TO RELATED APPLICATION

This application claims priority to Japanese Application No. 2018-230563, filed Dec. 10, 2018, the disclosure of which is incorporated in its entirety by reference herein.

TECHNICAL FIELD

The present invention relates to a particle number counting device and a particle number counting method.

TECHNICAL BACKGROUND

For example, a particle number counter known as a condensation particle counter (CPC) is used as a device that is capable of precisely counting particulate matter (i.e., of counting a particulate number (PN)) contained in extracted exhaust gas.

As is shown in Patent Document 1, this condensation particle counter operates by causing particulate matter to pass through a supersaturated alcohol atmosphere so that the diameter thereof grows to a large size, and then using laser light to count the particulate matter that is then expelled through a slit. A differential pressure flow meter that is used to adjust a flow rate of an introduced gas is provided in the condensation particle counter. This differential pressure flow meter measures a flow rate by detecting a differential pressure between an upstream side of a critical orifice and a downstream side thereof.

DOCUMENTS OF THE PRIOR ART

Patent Documents

[Patent document] Japanese Unexamined Patent Application (JP-A) No. 2012-127773

DISCLOSURE OF THE INVENTION

Problems to be Solved by the Invention

If exhaust gas analysis is performed at an elevated location (for example, at an altitude of 3000 m) using the above-described condensation particle counter, then the outside air pressure externally of the condensation particle counter decreases, and variations occur in the flow rate flowing through a critical orifice. Consequently, the flow rate of the exhaust gas flowing into the condensation particle counter ends up decreasing and increasing. As a result, the problem arises that it is not possible to perform accurate particle number counting.

Therefore, the present invention was conceived in order to solve the above-described problem, and it is a principal object thereof to reduce the effects on particle number counting from variations in the outside air pressure.

Means for Solving the Problem

In other words, a particle number counting device according to the present invention is characterized in being provided with an exhaust gas processing unit that performs predetermined processing on exhaust gas, a particle number counting unit that counts a number of particles contained in exhaust gas that has passed through the exhaust gas processing unit, a fluid resistance element that is provided downstream from the particle number counting unit, a suction pump that is provided downstream from the fluid resistance element, a gas supply path that is connected to a flow path between the fluid resistance element and the suction pump, and that supplies gas to a downstream side of the fluid resistance element, and a flow rate adjustment unit that is provided on the gas supply path, and that adjusts a flow rate of the gas that is supplied to the downstream side of the fluid resistance element.

According to the above-described structure, because a flow rate adjustment unit is provided on a gas supply path that introduces a gas to a downstream side of a fluid resistance element, by adjusting the flow rate of the gas supplied to the downstream side of the fluid resistance element in accordance with variations in the outside air pressure, it is possible to reduce variations in the flow rate flowing through the fluid resistance element. As a result, even if there are variations in the outside air pressure, it is still possible to perform accurate particle number counting.

In order to enable pressure variations to be corrected automatically and to improve the measurement accuracy when counting a particle number, it is desirable that there be further provided a pressure sensor that measures a differential pressure between a pressure on the upstream side of the fluid resistance element and a pressure on the downstream side thereof, or a pressure on the upstream side of the fluid resistance element, or an outside air pressure, and a control unit that controls the flow rate adjustment unit based on pressure measurements made by the pressure sensor.

More specifically, a structure in which the control unit controls the flow rate adjustment unit such that the differential pressure between the pressure on the upstream side of the fluid resistance element and the pressure on the downstream side thereof is within a predetermined range may be considered.

In order to enable exhaust gas to be introduced into the exhaust gas processing unit, and ensure that a differential pressure between a pressure on the upstream side of the fluid resistance element and a pressure on the downstream side thereof is within a predetermined range, it is desirable that the gas supply path be connected to the flow path between the exhaust gas processing unit and the particle number counting unit via a buffer tank.

As is described above, in a structure in which both the introduction of exhaust gas into the exhaust gas processing unit and the introduction of exhaust gas into the particle number counting unit are performed using a single suction pump, there is limited freedom of choice in selecting which type of suction pump to employ. For example, if precedence is given to the introduction of exhaust gas into the exhaust gas processing unit, then a large-capacity suction pump is necessary. However, if a large-capacity suction pump is employed, then it becomes difficult to accurately adjust the introduction of exhaust gas into the particle number counting unit. In contrast, if precedence is given to the introduction of exhaust gas into the particle number counting unit, then it is difficult for a large-capacity suction pump to be used, and introducing sufficient exhaust gas into the exhaust gas processing unit is also difficult.

In order to satisfactorily solve this problem, it is desirable that there be further provided a gas discharge path that is connected to the flow path between the exhaust gas processing unit and the particle number counting unit, an exhaust pump that is provided on the gas discharge path, and a buffer tank that is provided on the gas discharge path on the upstream side of the exhaust pump.

In this structure, in order to assist the introduction of exhaust gas into the exhaust gas processing unit using the suction pump that is connected to the gas supply path, it is desirable that the gas supply path be connected to the buffer tank.

Furthermore, a particle number counting method according to the present invention employs a particle number counting device provided with an exhaust gas processing unit that performs predetermined processing on exhaust gas, a particle number counting unit that counts a number of particles contained in exhaust gas that has passed through the exhaust gas processing unit, a fluid resistance element that is provided downstream from the particle number counting unit, a suction pump that is provided downstream from the fluid resistance element, a gas supply path that is connected to a flow path between the fluid resistance element and the suction pump, and supplies gas to a downstream side of the fluid resistance element, and a flow rate adjustment unit that is provided on the gas supply path, and adjusts a flow rate of the gas that is supplied to the downstream side of the fluid resistance element, and it is desirable that the flow rate adjustment unit be controlled based on a differential pressure between a pressure on the upstream side of the fluid resistance element and a pressure on the downstream side thereof, or on a pressure on the upstream side of the fluid resistance element, or on an outside air pressure.

Effects of the Invention

According to the above-described present invention, it is possible to reduce the effects on particle number counting from pressure variations.

BEST EMBODIMENTS FOR IMPLEMENTING THE INVENTION

Hereinafter, a particle number counting device according to an embodiment of the present invention will be described with reference to the drawings.

[Device Structure]

A particle number counting device 100 of the present embodiment counts particulate matter (i.e., counts a particulate number (PN), hereinafter referred to as a 'particle number') contained in exhaust gas. The exhaust gas is discharged from an exhaust pipe that is connected to an internal combustion engine, and is diluted using a constant volume sampler (CVS) or the like. A portion thereof is then extracted and introduced into the particle number counting device 100. Note that it is also possible for the exhaust gas to be diluted using a dilution gas separately from the CVS, or for the exhaust gas to be left undiluted.

Figure 1:
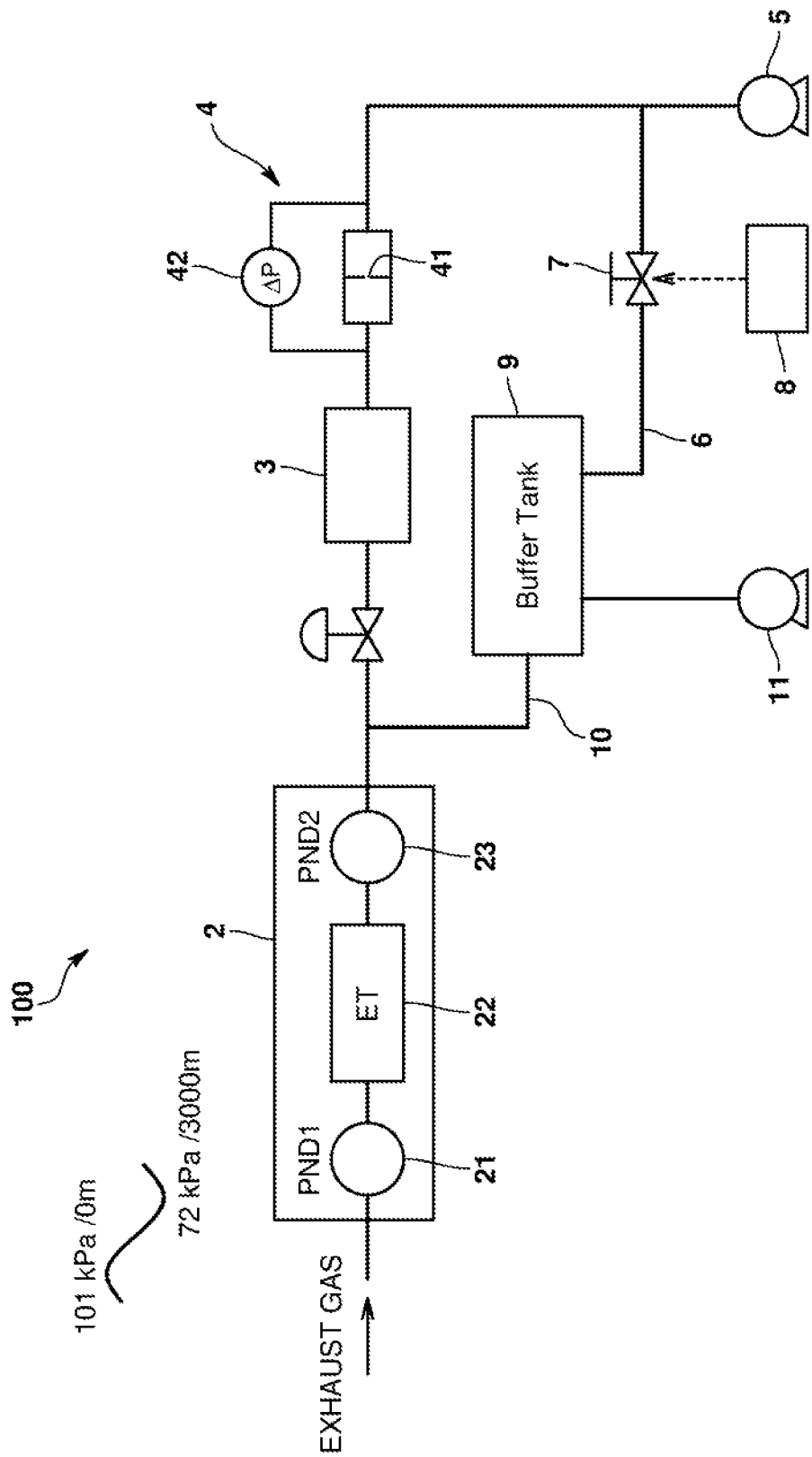
FIG. 1 is a view schematically showing a structure of a particle number counting device according to an embodiment of the present invention.

More specifically, as is shown in FIG. 1, the particle number counting device 100 is provided with an exhaust gas processing unit 2 that performs predetermined processing on exhaust gas diluted using a CVS or the like, a particle number counting unit 3 that counts a number of particles contained in exhaust gas that has passed through the exhaust gas processing unit 2, a differential pressure flow meter 4 that is provided downstream from the particle number counting unit 3, a suction pump 5 that is provided downstream from the differential pressure flow meter 4, a gas supply path 6 that is connected to a flow path between the differential pressure flow meter 4 and the suction pump 5, and supplies gas to a downstream side of the differential pressure flow meter 4, a flow rate adjustment unit 7 that is provided on the gas supply path 6, and adjusts a flow rate of the gas that is supplied to the downstream side of the differential pressure flow meter 4, and a control unit 8 that controls the flow rate adjustment unit 7.

The exhaust gas processing unit 2 is a volatile particle remover (VPR) that removes volatile particles that are formed by sulfuric acid mist and a soluble organic fraction (SOF) contained in the exhaust gas.

This volatile particle remover 2 has a heat diluter 21, an evaporation tube 22, and a cold diluter 23. In the volatile particle remover 2, the exhaust gas is diluted, for example, by a factor of between 10 and 200 by the heat diluter 21 which has a predetermined first heating temperature (for example, 150–400° C.), and volatile particles that have already been formed are gasified by the evaporation tube 22 which has a second heating temperature (for example, 300–400° C.) provided further downstream. Thereafter, the exhaust gas is once again diluted, for example, by a factor of between 10 and 15 by the cold diluter 23, and the temperature thereof is lowered below a predetermined cooling temperature (for example, 35° C.). As a result, particle generation due to recondensation and particle loss due to thermophoresis are prevented.

The particle number counting unit 3 is a condensation particle counter (CPC) and operates by causing particulate matter to pass through a supersaturated alcohol (i.e., butanol or the like) atmosphere so that the diameter thereof grows to a large size, and then using laser light to count the particulate matter that is then expelled through a slit. If the introduction flow rate into this condensation particle counter becomes too fast, the growth of the particulate matter becomes insufficient. Because of this, it is desirable that the introduction flow rate be restricted to a predetermined range in which the particulate matter is still able to grow to a desired particle diameter.

The differential pressure flow meter 4 measures the flow rate of exhaust gas flowing into the particle number counting unit 3, and is formed so as to measure the flow rate from a differential pressure between the pressure on an upstream side of an orifice 41 and the pressure on a downstream side thereof. The exhaust gas flow rate obtained by this differential pressure flow meter 4 is sent to the control unit 8. This differential pressure flow meter 4 has the orifice 41, which is a diaphragm mechanism that serves as a fluid resistance element, and also has a pressure sensor 42 that measures the differential pressure in the orifice 41.

The suction pump 5 enables exhaust gas that has been processed by the exhaust gas processing unit 2 to flow into the particle number counting unit 3, and causes a predetermined differential pressure to be generated in the orifice 41 of the differential pressure flow meter 4. The suction pump 5 of the present embodiment suctions at a constant volume.

The gas supply path 6 introduces gas between the differential pressure flow meter 4 and the suction pump 5. One end thereof is connected to the flow path between the differential pressure flow meter 4 and the suction pump 5, while another end thereof is connected to a buffer tank 9.

The buffer tank 9 is provided on a gas discharge path 10 that is connected to the flow path between the exhaust gas processing unit 2 and the particle number counting unit 3, and an exhaust pump 11 is also provided on the gas discharge path 10. The buffer tank 9 reduces pulsations in the exhaust pump 11. Exhaust gas is introduced into the exhaust gas processing unit 2 via this structure. In addition, because the gas supply path 6 is connected to the buffer tank 9, exhaust gas is introduced into the exhaust gas processing unit 2 by the suction pump 5.

Additionally, the flow rate adjustment unit 7 that is used to adjust the flow rate of the gas that is supplied between the differential pressure flow meter 4 and the suction pump 5 is provided on the gas supply path 6. This flow rate adjustment unit 7 is an electromagnetic valve. As a result of the valve opening thereof being controlled by the control unit 8, the flow rate of the gas supplied to the downstream side of the differential pressure flow meter 4 is adjusted so that the downstream-side pressure in the orifice 41 of the differential pressure flow meter 4 is also adjusted.

Figure 2:
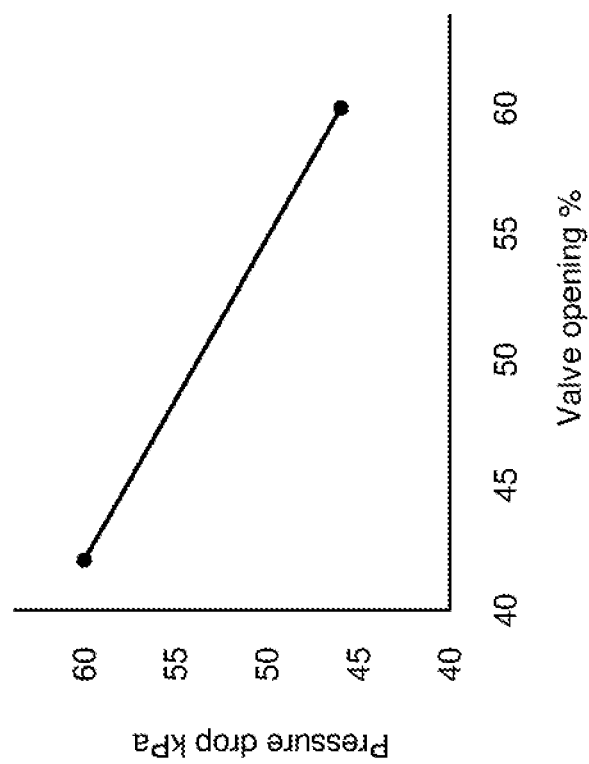
FIG. 2 is a view showing relationship data of the same embodiment.

The control unit 8 controls the valve opening of the flow rate adjustment unit (i.e., the electromagnetic valve) 7 in accordance with the differential pressure between the pressure on the upstream side of the orifice 41 and the pressure on the downstream side thereof as measured by the pressure sensor 42. Here, the control unit 8 controls the flow rate adjustment unit 7 such that the differential pressure between the pressure on the upstream side of the orifice 41 and the pressure on the downstream side thereof falls within a predetermined range. The control unit 8 controls the flow rate adjustment unit 7 by acquiring a pressure measurement signal from this pressure sensor 42. Here, relationship data showing a relationship between the differential pressure in the fluid resistance element and the valve opening is held in the control unit 8, and a control signal is output to the electromagnetic valve 7 based on the acquired pressure measurement signal. For example, as is shown in FIG. 2, the aforementioned relationship data is data showing a relationship between the differential pressure (Pressure drop [kPa]) and the valve opening (Valve opening [%]. As a result of the flow rate adjustment unit 7 being controlled in this way, any variations in the differential pressure in the orifice can be reduced irrespective of changes in the outside air pressure.

[Effects Obtained from the Present Embodiment]

According to the particle number counting device 100 of the present embodiment, because the flow rate adjustment unit 7 is provided on the gas supply path 6 that introduces a gas downstream from the differential pressure flow meter 4, by adjusting the flow rate of the gas that is supplied to the downstream side of the differential pressure flow meter 4 (i.e., of the orifice 41) in accordance with variations in the outside air pressure, it is possible to reduce variations in the flow rate flowing through the orifice 41. As a result, even if there are variations in the outside air pressure, it is still possible to perform accurate particle number counting. In particular, because the control unit 8 controls the electromagnetic valve 7, which is serving as the flow rate adjustment unit, it is possible to automatically correct pressure variations, and to thereby improve the measurement accuracy when performing particle number counting.

Moreover, in the present embodiment, because the flow rate of the exhaust gas introduced into the condensation particle counter 3 is adjusted by the suction pump 5, and the flow rate of the exhaust gas introduced into the exhaust gas processing unit 2 is principally adjusted by the exhaust pump 11, not only can a satisfactory flow rate be ensured for the exhaust gas flowing into the exhaust gas processing unit 2, but this flow rate can be adjusted to a more appropriate flow rate for enabling particulate matter to be properly grown in the condensation particle counter 3.

Variant Embodiments

Note that the present invention is not limited to the above-described embodiment.

Figure 3:
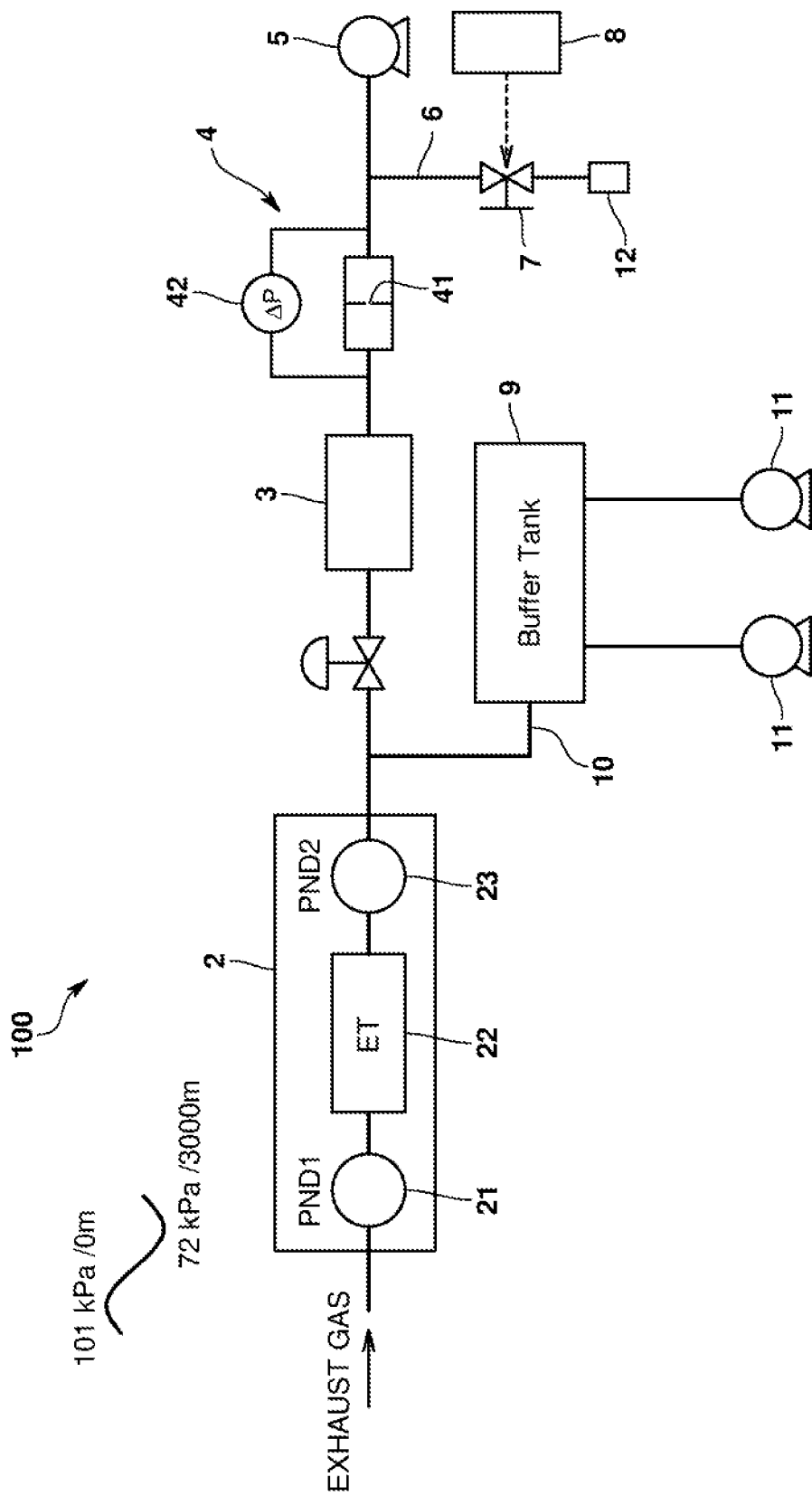
FIG. 3 is a view schematically showing a structure of a particle number counting device according to a variant embodiment.

For example, the structure shown in FIG. 3 may also be employed for a particle number counting device. In this particle number counting device 100, a structure is employed in which the other end of the gas supply path 6 is open to the atmosphere, and air is introduced via this other end. An anti-dust filter 12 such as, for example, a HEPA filter or the like is provided on the other end of the gas supply path 6. The flow rate of air that is supplied downstream from the differential pressure flow meter 4 is adjusted by the flow rate adjustment unit 7 provided on the gas supply path 6. Note that, in FIG. 3, two exhaust pumps 11 that are used to introduce exhaust gas into the exhaust gas processing unit 2 via the buffer tank 9 are provided, however, it is also possible to provide only a single exhaust pump 11.

Other than orifice, it is also possible for a structure that generates a pressure difference between the upstream side and the downstream side to be provided as the fluid resistance element and, for example, a Venturi type or capillary type of fluid resistance element may be used. In addition, a fixed flow meter or a differential pressure gauge or the like that employs these may also be used as the fluid resistance element.

In addition to the above-described embodiment, it is also possible for a pressure sensor that measures the outside air pressure outside the particle number counting device 100 to be provided, and for the control unit 8 to control the flow rate adjustment unit 7 using an outside air pressure obtained by this pressure sensor. Here, the pressure sensor that measures the outside air temperature may be the pressure sensor provided in the particle number counting device 100, or may be a pressure sensor that is provided independently of the particle number counting device 100. Furthermore, it is also possible to employ a structure in which a pressure sensor that measures the pressure on the upstream side of the fluid resistance element to be provided, and for the control unit 8 to control the flow rate adjustment unit 7 using an upstream-side pressure obtained by this pressure sensor.

In the above-described embodiment, a structure is employed in which a buffer tank is provided in order to reduce pulsation, however, it is not essential that the buffer tank be provided.

In addition, in the above-described embodiment, a structure is employed in which the gas discharge path 10 and the exhaust pump 11 are provided, however, it is not essential that these be provided. In this case, the suction pump 5 is used to not only introduce exhaust gas into the exhaust gas processing unit 2, but to also introduce diluted exhaust gas into the particle number counting unit 3.

Furthermore, it should be understood that the present invention is not limited to the above-described embodiment, and that various modifications and the like may be made thereto insofar as they do not depart from the spirit or scope of the present invention.

DESCRIPTION OF THE REFERENCE NUMERALS

100 . . . Particle Number Counting Device
2 . . . Exhaust Gas Processing Unit

3 ... Particle Number Counting Unit
4 ... Differential Pressure Flow Meter
41 ... Orifice (Fluid Resistance Element)
42 ... Pressure Sensor
5 ... Suction Pump
6 ... Gas Supply Path
7 ... Flow Rate Adjustment Unit
8 ... Control Unit
9 ... Buffer Tank
10 ... Gas Discharge Path
11 ... Exhaust Pump

What is claimed is:

1. A particle number counting device comprising:
a particle number counting unit that counts a number of particles contained in exhaust gas;
a fluid resistance element that is provided downstream from the particle number counting unit;
a suction pump that is provided downstream from the fluid resistance element;
a gas supply path that is connected to a flow path between the fluid resistance element and the suction pump, and that supplies gas to a downstream side of the fluid resistance element;
a flow rate adjustment unit that is provided on the gas supply path, and that adjusts a flow rate of the gas that is supplied to the downstream side of the fluid resistance element;
a control unit; and
a pressure sensor that measures a differential pressure between a pressure on the upstream side of the fluid resistance element and a pressure on the downstream side thereof, or a pressure on the upstream side of the fluid resistance element, or an outside air pressure, wherein the flow rate adjustment unit adjusts the flow rate by the control unit changing the valve opening of the flow rate adjustment unit based on pressure measurements made by the pressure sensor.

2. The particle number counting device according to claim 1, wherein the flow rate adjustment unit adjusts the flow rate such that a differential pressure between a pressure on the upstream side of the fluid resistance element and a pressure on the downstream side thereof is within a predetermined range.

3. The particle number counting device according to claim 1, wherein the gas supply path is connected to the flow path between an exhaust gas processing unit and the particle number counting unit via a buffer tank.

4. The particle number counting device according to claim 1, further comprising:
an exhaust gas processing unit that is provided upstream from the particle number counting unit, and that performs predetermined processing on exhaust gas;
a gas discharge path that is connected to the flow path between the exhaust gas processing unit and the particle number counting unit;
an exhaust pump that is provided on the gas discharge path; and
a buffer tank that is provided on the gas discharge path on the upstream side of the exhaust pump, wherein the gas supply path is connected to the buffer tank.

5. A particle number counting method that employs a particle number counting device comprising a particle number counting unit that counts a number of particles contained in exhaust gas, a fluid resistance element that is provided downstream from the particle number counting unit, a suction pump that is provided downstream from the fluid resistance element, a gas supply path that is connected to a flow path between the fluid resistance element and the suction pump, and that supplies gas to a downstream side of the fluid resistance element, a flow rate adjustment unit that is provided on the gas supply path, and that adjusts a flow rate of the gas that is supplied to the downstream side of the fluid resistance element, a control unit, and a pressure sensor that measures a differential pressure between a pressure on the upstream side of the fluid resistance element and a pressure on the downstream side thereof, or a pressure on the upstream side of the fluid resistance element, or an outside air pressure, the method comprising:
controlling the flow rate adjustment unit based on a differential pressure between a pressure on the upstream side of the fluid resistance element and a pressure on the downstream side thereof, or on a pressure on the upstream side of the fluid resistance element, or on an outside air pressure; and
adjusting the flow rate by the flow rate adjustment unit by changing the valve opening of the flow rare adjustment unit by the control unit based on pressure measurements made by the pressure sensor.

* * * * *